Oct. 17, 1967
R. E. MORGAN
3,348,123
INHIBIT CONTROL FOR POWER CIRCUITS
Filed April 17, 1964
5 Sheets-Sheet 1
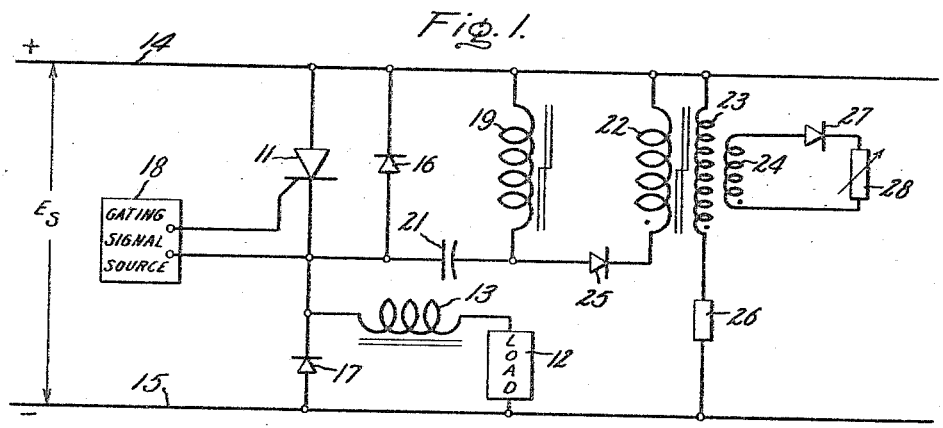
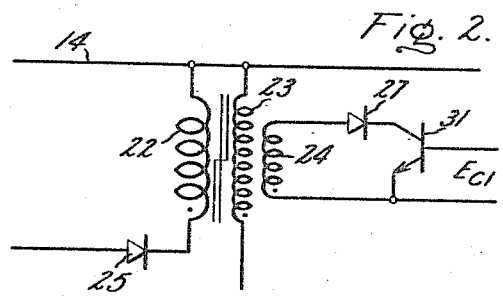
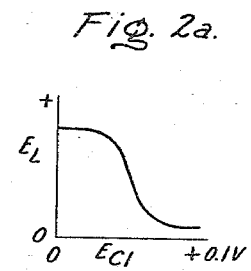
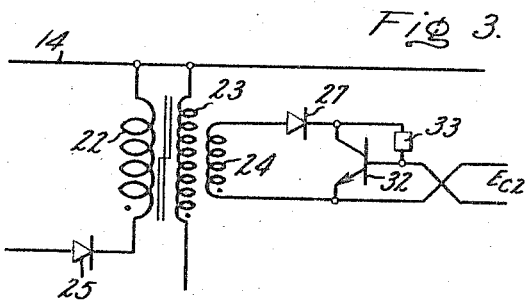
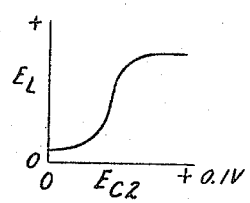
Inventor:
Raymond E. Morgan,
by Charles W. Helzer
His Attorney.

Inventor:
Raymond E. Morgan,
by Charles W Hezer
His Attorney.

Inventor:
Raymond E. Morgan,
by Charles O Helzer
His Attorney.

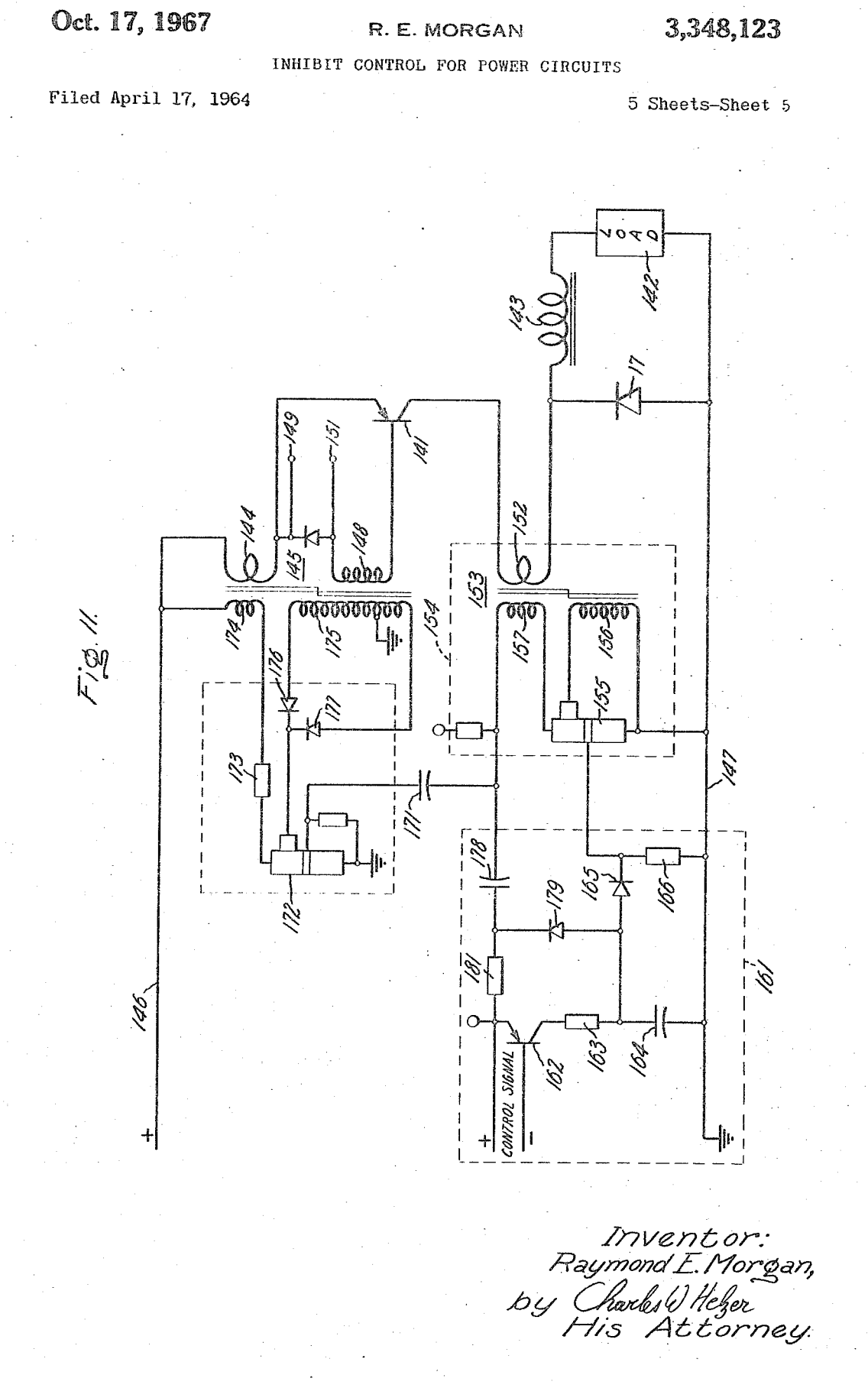

Oct. 17, 1967 R. E. MORGAN 3,348,123
INHIBIT CONTROL FOR POWER CIRCUITS
Filed April 17, 1964 5 Sheets-Sheet 5

Fig. 11.

Inventor:
Raymond E. Morgan,
by Charles W Helzer
His Attorney.

United States Patent Office 3,348,123
Patented Oct. 17, 1967

3,348,123
INHIBIT CONTROL FOR POWER CIRCUITS
Raymond E. Morgan, Schenectady, N.Y., assignor to General Electric Company, a corporation of New York
Filed Apr. 17, 1964, Ser. No. 360,557
12 Claims. (Cl. 321—44)

ABSTRACT OF THE DISCLOSURE

An inhibit control for a transistor or SCR time ratio control or inverter power circuit employs a saturable core having a saturable reactor winding and a reset winding and at least two additional inhibit windings each forming a passive closed series loop with a blocking diode and a control transistor or variable resistor. One inhibit winding linearly controls the saturable reactor winding to proportionally control the load voltage, while the second and other inhibit windings provide on-off take over control possibly as an "and" or "or" function and are operative upon an overcurrent or overtemperature condition, etc.

---

The present invention relates to a new and improved inhibit control for power circuits.

More particularly, the invention relates to a fast-responding continuous and/or take-over inhibit control for power circuits using semiconductor switching devices.

With the increasing use of semiconductor switching devices in power circuits, such as a silicon controlled rectifier, the triac, the diac, or the silicon control switch, there has come into existence a widely recognized need for fast-responding and reliable take-over control circuits to protect these devices from overload and overtemperature conditions. Such fast-responding and reliable take-over control circuits are required since the semiconductor devices used in power circuits can be exposed for only short periods of time to operating conditions such as overvoltage and overtemperature before they are permanently damaged. The take-over control employed should be able to operate in the power circuit as a current limit, a temperature limit, an overvoltage limit, or some other form of limit and/or provide limit protection against two or more such phenomenon. To do this the take-over control must be able to take over the control of a power circuit from the main control practically instantaneously, and not interfere with the main control during normal operating conditions of the power circuit. One example of the need for such a take-over control would be in connection with a power amplifier used to regulate the speed of a direct current motor by control of the armature voltage. In order to properly protect the semiconductor device used in the power amplifier, it would be necessary to include both a current limit and thermal overlimit protection. The current limit would prevent excessive overload of the power amplifier during acceleration or excessive mechanical load, and the thermal overlimit protection would prevent damage to the motor or possibly to the power amplifier from an excessive number of accelerations, starts, or any condition that may cause overheating, and yet be within the parameters of the current limit. Accordingly, it can be appreciated that some of the applications for the take-over control require that several simultaneous conditions occur before control of the power amplifier output voltage is taken over, and that therefore an "and" function is required for the take-over control. Additionally, it is necessary that the take-over control have an insulated input so that various input control signals can be insulated from each other, and from the output of the power amplifier, the power source for the power amplifier, and the like. Since semiconductor switching devices do not provide the needed insulation, a saturable transformer which does provide such required insulation is provided. The combination of semiconductor switching devices with saturable transformers provides the desired insulation along with the advantages of the fast switching speeds of semiconductor devices.

It is therefore a primary object of the present invention to provide a new and improved fast-responding and reliable take-over inhibit control for semiconductor power circuits.

Another object of the invention is to provide a take-over inhibit control capable of having multiple insulated inputs which are effectively isolated from each other and from the power circuit being controlled, and which are capable of providing an "and" function in their take-over control action.

Another object of the invention is a provision of such take-over inhibit control which is passive under normal operating conditions, and hence does not adversely affect the power circuit it protects during normal conditions of operation.

In practicing the invention, an inhibit control for a power circuit is provided which includes a saturable reactor winding wound on a common saturable core member with a reset winding. A first inhibit winding is wound in common on the saturable core member with the saturable reactor winding and the reset winding. First circuit means are connected in series circuit relationship with the first inhibit winding to form a passive closed series circuit loop energized by the inhibit winding. First control means are included in the first circuit means for controlling current flow through the closed series circuit loop to thereby control the operation of the saturable reactor winding. At least one additional take-over inhibit winding is wound in common on the saturable core member with the saturable reactor winding, the reset winding, and the first inhibit winding. Additional circuit means are connected in series circuit relationship with the additional inhibit winding to form a second passive closed series circuit loop energized by the additional take-over inhibit winding. An additional control means is included in the additional circuit means for controlling the current flow through the additional closed series circuit loop to thereby control the operation of the saturable reactor winding. The saturable reactor winding is of course itself connected in circuit relationship with a conductivity controlled conducting device such as a silicon controlled rectifier, a silicon control switch, a triac, or a diac and operates to control current flow through the device. In a preferred embodiment of the invention the first control means comprises a continuous linearly variable control and the additional control means comprises an on-off take-over control.

Other objects, features, and many of the attendant advantages of this invention will be appreciated more readily as the same becomes better understood by reference to the following detailed description when considered in connection with the accompanying drawings, wherein like parts in each of the several figures are identified by the same reference character, and wherein:

FIGURE 1 is a schematic circuit diagram of a time ratio control power circuit employing only a single insulated inhibit control constructed in accordance with the present invention;

FIGURE 2 is a schematic circuit diagram of an alternative form of insulated inhibit control suitable for use in the power circuit arrangement of FIGURE 1;

FIGURE 2a is a control voltage versus output voltage characteristic curve for the inhibit control of FIGURE 2;

FIGURE 3 is a schematic circuit diagram of still another alternative form of inhibit control suitable for use in the power circuit arrangement of FIGURE 1;

3

Figure 4:
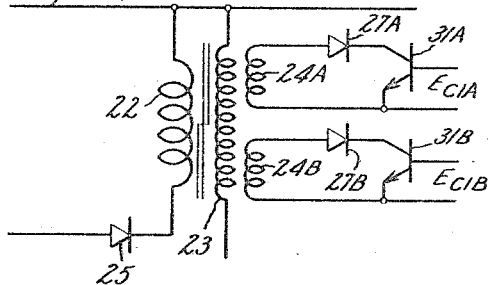
Figure 7:
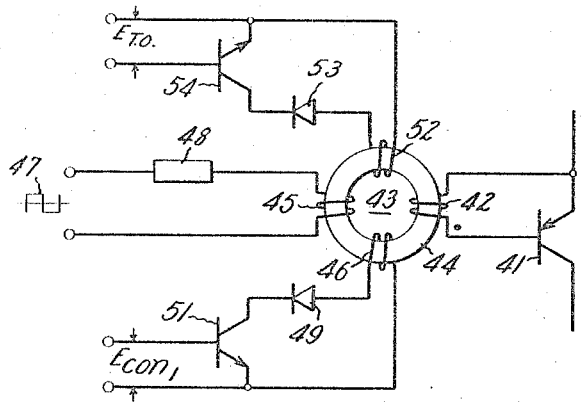
Figure 5:
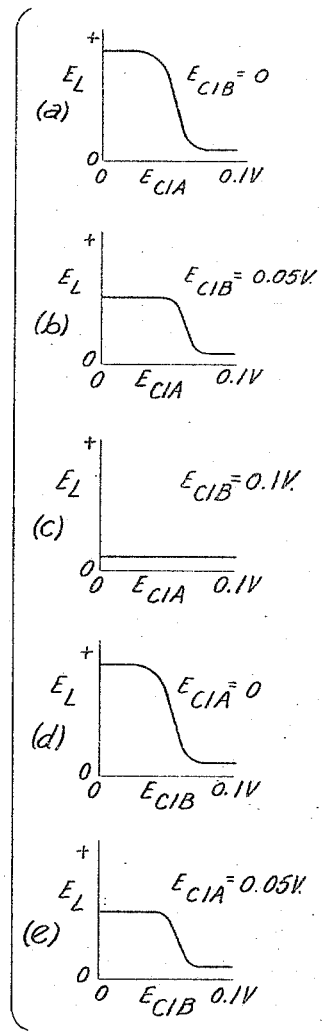
Figure 6:
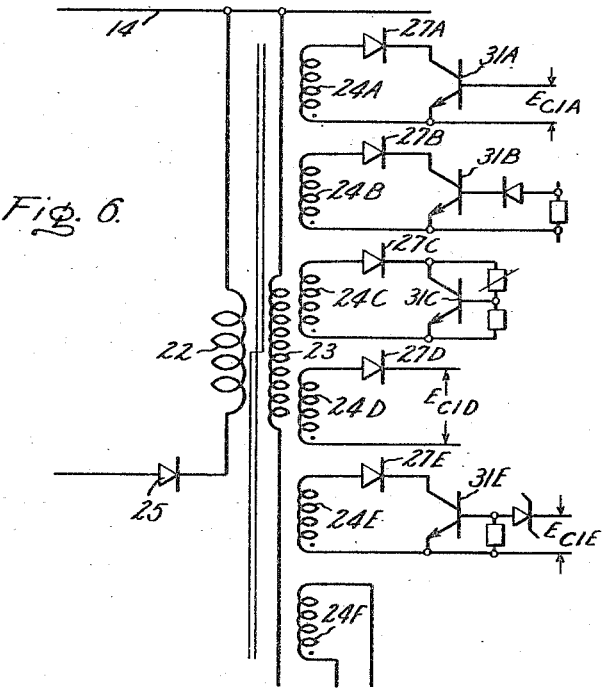
Figure 10:
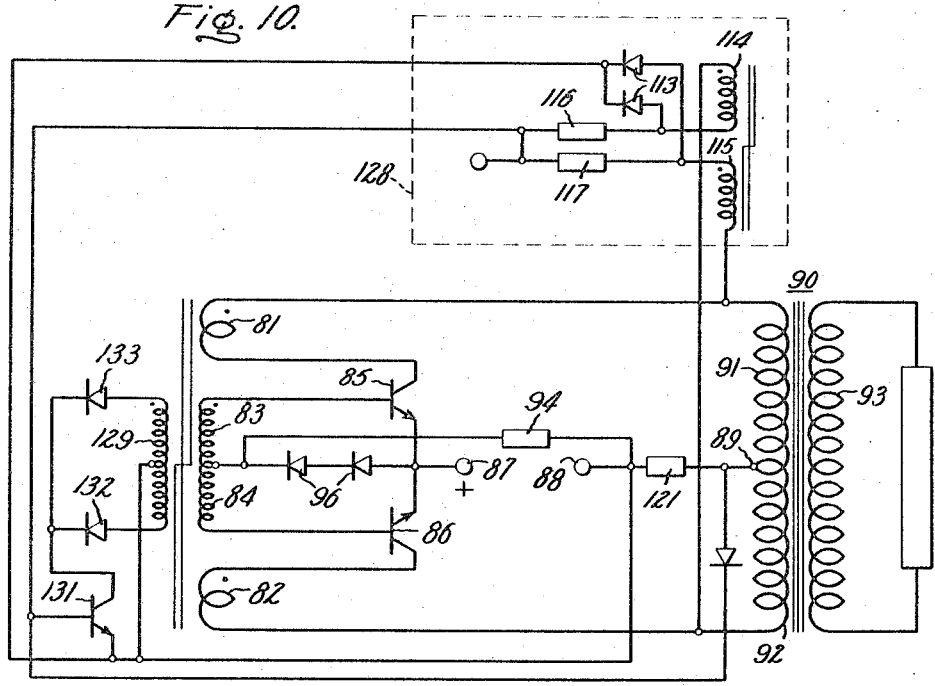
Figure 9:
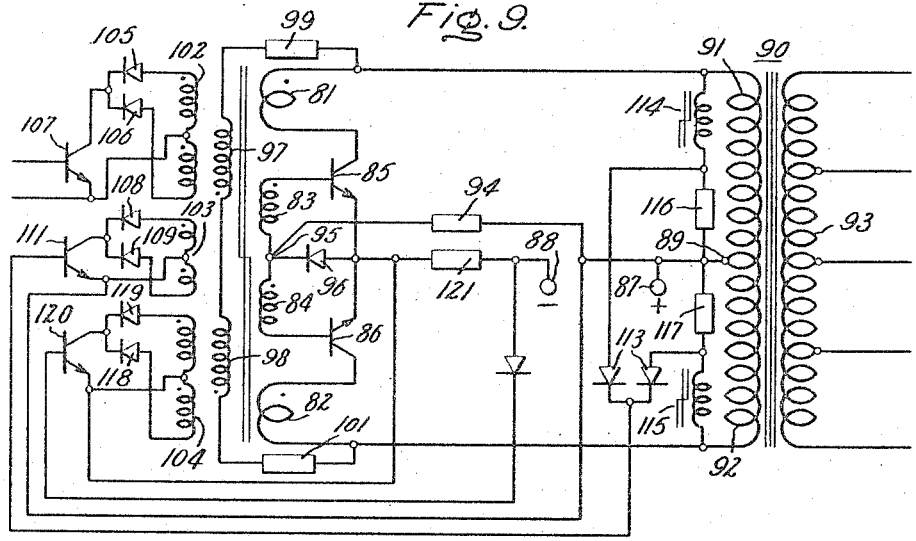
Figure 8:
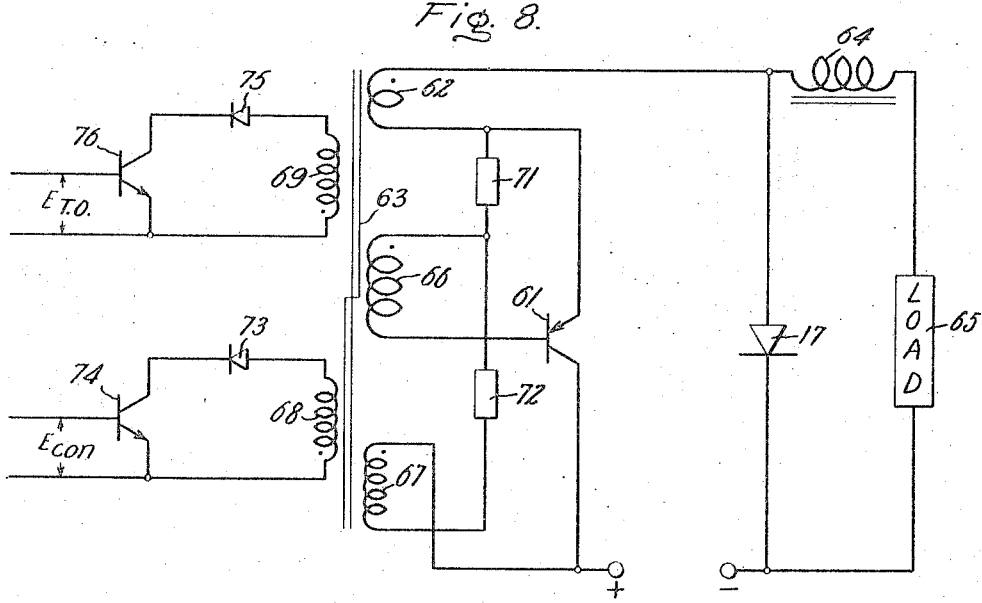

FIGURE 3a is a control voltage versus output voltage characteristic curve for the inhibit control of FIGURE 3;

FIGURE 4 is a schematic circuit diagram of still another form of new and improved take-over inhibit control constructed in accordance with the present invention, and suitable for use in the power circuit of FIGURE 1;

FIGURE 5 is a series of control voltage versus output voltage characteristic curves illustrating possible operating characteristics of the inhibit control arrangement of FIGURE 4;

FIGURE 6 is still another form of the new and improved inhibit take-over control constructed in accordance with the invention which provides a multiplicity of take-over controls, and suitable for use in the power circuit of FIGURE 1;

FIGURE 7 is a schematic circuit diagram of another form of time ratio control power circuit having a take-over inhibit control employing the principles of the present invention;

FIGURE 8 is a schematic circuit diagram of a transistor-saturable transformer time ratio control power circuit employing the inhibit take-over control of the present invention;

FIGURE 9 is a schematic circuit diagram of a transistor-inverter power circuit using a multiplicity of inhibit take-over controls constructed in accordance with the invention;

FIGURE 10 is a modified form of the inverter power circuit shown in FIGURE 9 and illustrates a single inhibit take-over control having a multiplicity of control signal input sources; and FIGURE 11 is a schematic circuit diagram of a time ratio control power circuit employing a current limit and a proportional power main control both provided by an inhibit take-over control constructed in accordance with the present invention.

FIGURE 1 of the drawings is a schematic circuit diagram of a time ratio control power circuit for supplying proportionally controlled amounts of chopped direct current electric potential across a load in accordance with the well known time ratio control principle. For a more detailed discussion of the principles of time ratio control reference is made to the United States Patent No. 3,102,-206 issued Aug. 27, 1963, entitled, "Saturable Current Transformer-Transistor Circuit," R. E. Morgan inventor, assigned to the General Electric Company. The time ratio control power circuit shown in FIGURE 1 is comprised by a silicon controlled rectifier device 11 (SCR) which is connected in series circuit relationship with a load 12 and a filter inductance 13 across a pair of direct current power supply terminals 14 and 15. The SCR 11 has a feedback diode 16 connected in parallel circuit relationship with it in a reverse polarity sense. That is to say, the feedback diode 16 has its anode electrode connected to the cathode electrode of SCR 11, and has its cathode electrode connected to the anode electrode of SCR 11. The series circuit comprised by the load 12 and filter inductance 13 has a conventional coasting rectifier 17 connected in parallel circuit relationship with it for circulating current induced by the filter inductance 13 during the off intervals of SCR 11 in the well known coasting rectifier manner. The SCR 11 has its gating electrode connected to a gating signal source 18 which may comprise a unijunction transistor oscillator circuit, or some other well known source of low voltage, low current square wave gating signals.

A commutating circuit comprised by a first saturable reactor winding 19 and a commutating capacitor 21 is connected in series circuit relationship across the input load terminals of the SCR 11 for commutating off the SCR 11 by the well known Morgan circuit technique. In addition, an on-time control is provided by a second saturable reactor winding 22, a reset winding 23, and an inhibit control winding 24, all wound in common on a

4 saturable core member (not shown) to form a saturable core transformer. The saturable reactor winding 22 is connected in series circuit relationship with a blocking diode 25 across the first saturable winding 19. The reset winding 23 is connected in series circuit relationship with a limiting resistor 26 across the power supply terminals 14 and 15. The control winding 24 is connected in a passive closed series circuit loop, which it energizes, with a blocking diode 27 and a variable resistor 28. The variable resistor 28 provides a means for controlling current flow through the passive closed series circuit loop comprised by winding 24, blocking diode 27, and variable resistor 28.

For a more detailed description of the operation of the on-time controlled time ratio control power circuit of FIGURE 1, reference is made to a copending application Ser. No. 65,531, filed Oct. 27, 1960, entitled "On-Time Silicon Controlled Rectifier Circuit" by Raymond E. Morgan, now Patent No. 3,138,722 granted June 23, 1964 and assigned to the General Electric Company. Briefly, however, it can be stated that in operation, the gating signal source 18 turns on the SCR 11 at predetermined intervals, and the SCR 11 is turned off by the commutation circuit means after varying intervals of conducting time as determined by the setting of the control variable resistor 28 in the on-time control. This variable control over the on-time of the SCR 11 is achieved by varying the value of the current flowing through the inhibit control winding 24 of the on-time saturable core transformer. If the variable resistor 28 is adjusted to provide maximum resistance in the circuit so that no current is circulated through the passive closed series circuit loop by winding 24, then reset of the saturable core transformer is controlled entirely by the ampere-turns of the reset winding 23. Since the amount of reset of the secondary winding 22 in fact determines the on-time of the SCR 11, and hence the value of the output load voltage $E_L$ as explained in the above-identified Patent No. 3,138,722, under these conditions maximum reset of the core of winding 22 will occur, and hence maximum load voltage $E_L$ will be supplied across load 12. As the amount of resistance 28 is decreased, current will flow in the winding 24 which produces ampere-turns that oppose the ampere-turns of reset winding 23. As a result, the core of saturable winding 22 will be reset less so that the on-time of SCR 11 is proportionally decreased. This value can be decreased linearly to the point where maximum current flowing in the control winding 24 will oppose any reset of the core of winding 22 thereby maintaining the SCR 11 turned off to provide minimum load voltage $E_L$ across load 12. Accordingly, it can be appreciated that variable resistor 28 in effect varies the load voltage supplied across load 12. During the setting intervals of operation of the on-time saturable reactor formed by windings 22, 23, and 24, the diode 27 blocks any current flow through inhibit control winding 24 so that this winding remains passive and has no influence on the core of the transformer.

FIGURE 2 of the drawings shows a modified form of the construction of the on-time control saturable core transformer and its associated circuitry wherein an NPN junction transistor 31 is substituted in place of the variable resistor 28 in the circuit arrangement of FIGURE 1, and a variable control signal $E_{C1}$ is supplied to the base of the junction transistor 31. FIGURE 2a of the drawings illustrates the control voltage versus load voltage output characteristic of a time ratio control power circuit modified to incorporate the on-time control of FIGURE 2. From an examination of FIGURE 2a it can be appreciated that with increasing control voltage $E_{C1}$, the load voltage $E_L$ will decrease from a maximum to a minimum over a linearly decreasing curve which provides relatively smooth control over the value of the output load voltage $E_L$ of the time ratio control power circuit incorporating such an on-time control. It can also be appreciated that if the value of the control voltage $E_{C1}$ is increased rapidly from a very low value in the neighborhood of 0 to .05 volt to a relatively high value in the neighborhood of 0.1 volt, then a substantially on-off type of control can be achieved over the load voltage $E_L$ which under such circumstances would shift from a high value to a minimum value concurrently with the change in control voltage $E_{C1}$.

FIGURE 3 of the drawings illustrates still another form of on-time control circuit wherein an NPN junction transistor having its base and collector electrodes interconnected through a bias resistor 33, and having a control voltage $E_{C2}$ applied across its base-emitter, is substituted in place of the variable resistor 28 of the circuit arrangement of FIGURE 1. The control voltage versus load voltage characteristic of a time ratio control power circuit incorporating the control of FIGURE 3, is illustrated in FIGURE 3a of the drawings. From an examination of FIGURE 3a it can be appreciated that for increasing values of control voltage $E_{C2}$, the load voltage $E_L$ supplied to the load of the time ratio control power circuit will increase from a minimum value in the neighborhood of 0 volt to a maximum value over a linearly increasing curve. From a comparison of the characteristic curves of FIGURES 2a and 3a, and FIGURES 2 and 3, it can be appreciated that the on-time control for a time ratio control power circuit such as that shown in FIGURE 1 can be readily modified for use with any type of varying control signal whether the control signal increases linearly from a low to a high value, or conversely linearly decreases from a high to a low value to provide linear control over the output voltage of a time ratio control power circuit; or whether it increases or decreases abruptly to provide on-off control over the output voltage of the power circuit.

FIGURE 4 of the drawings shows one form of practicing the present invention which employs many of the principles described with relation to FIGURES 1 through 3. The circuit arrangement of FIGURE 4 is designed to be incorporated into a time ratio control power circuit such as that shown in FIGURE 1 of the drawings to control the on-time of the load current carrying SCR 11. In the circuit arrangement of FIGURE 4, the on-time saturable core transformer comprised by saturable reactor winding 22 and reset winding 23 includes a first inhibit control winding $24_A$ and at least one additional take-over inhibit control winding $24_B$ wound in common on the saturable core member of the saturable core transformer. The first inhibit winding $24_A$ is included in a passive closed series circuit loop which is energized by the winding $24_A$, and further includes a blocking diode $27_A$ and an NPN junction transistor $31_A$ having a control signal $E_{C1A}$ supplied between its base-emitter. By this arrangement the transistor $31_A$ comprises a first control means for controlling current flow through the closed series circuit loop including the first inhibit winding $24_A$ and the blocking diode $27_A$. The additional take-over inhibit winding $24_B$ likewise is included in an additional passive closed series circuit loop comprised by a blocking diode $27_B$ and an NPN junction transistor $31_B$ having its base-emitter connected across a second source of control signals $E_{C1B}$. Accordingly, it can be appreciated that the transistor $31_B$ constitutes an additional control means for controlling current flow through the additional inhibit winding $24_B$ and the additional passive closed series circuit loop in which it is included. In the circuit arrangement of FIGURE 4, it is assumed that the two windings $24_A$ and $24_B$ have the same number of turns; however, varying ratios between the number of turns of these two windings can be provided to obtain varying control characteristics as will be explained more fully hereinafter.

Several load voltage versus control voltage characteristics obtainable with the circuit arrangement of FIGURE 4 are illustrated in FIGURE 5 of the drawings. As can be determined from an examination of FIGURE 5, the value of the control voltage supplied to one of the control transistors, $31_B$, for example, determines the effect that the control voltage supplied to the remaining control transistor $31_A$ will have. In FIGURE 5a it is assumed that the control voltage $E_{C1B}$ supplied to control transistor $31_B$ is zero, and the load voltage versus control voltage characteristic of the circuit of FIGURE 4 then appears as shown in FIGURE 5a wherein for linearly increasing values of control voltage $E_{C1A}$, the load voltage $E_L$ decreases proportionally. As shown in FIGURE 5b, if the control voltage $E_{C1B}$ supplied to control transistor $31_B$ is increased to the value .05 volt as shown, then the maximum load voltage $E_L$ obtainable is decreased to about one-half that obtainable with the control voltage values plotted in FIGURE 5a, and it decreases linearly for increasing values of $E_{C1A}$. If the control voltage $E_{C1B}$ then is increased to its full value of 0.1 volt as shown in FIGURE 5c, it can be appreciated that the control voltage $E_{C1A}$ has no effect on the load voltage $E_L$, and it remains at its zero or minimum value. The converse of the situations shown in FIGURES 5a, 5b, and 5c is true in that if the control voltage $E_{C1A}$ is held at zero value and the control voltage $E_{C1B}$ is varied over its full range from zero to 0.1 volt, the load voltage $E_L$ will vary linearly from a maximum to its minimum value as shown in FIGURE 5d. By comparison of FIGURES 5a and 5d, it can be appreciated that it does not matter which one of the control voltages $E_{C1A}$ or $E_{C1B}$ is used to linearly control the output voltage $E_L$. FIGURE 5e illustrates the converse situation to that plotted in FIGURE 5d. Hence, it can be appreciated that by maintaining one of the control voltages $E_{C1B}$, for example, at its zero value, the other control voltage $E_{C1A}$ can be used as the main control for proportionally controlling the value of the output load voltage $E_L$ developed by the time ratio control power circuit. Subsequently, if it is desired to take over control of the power circuit to turn it off, all that need be required is that an alarm signal developed to indicate an overcurrent, or overvoltage, an overtemperature, or other condition to be protected against, be applied as the control voltage $E_{C1B}$ to the second control transistor $31_B$ to thereby cause the power circuit to turn off substantially as shown in FIGURE 5c of the drawings. Further, it can be appreciated that from a comparison of FIGURES 5b and 5e the two control voltages $E_{C1A}$ and $E_{C1B}$ could be used to provide an "and" function wherein with both control voltages present, and each having a value of .05 volt, the circuit would be driven to its off or no load voltage condition substantially as shown in FIGURES 5b and 5e. It should be further noted that varying ratios may be set to provide various relations for the control voltages $E_{C1A}$ and $E_{C1B}$ by varying the number of turns of the inhibit windings $24_A$ and $24_B$ so long as the control voltages $E_{C1A}$ and $E_{C1B}$ are large compared to the respective forward drop of the emitter-base of the control transistors $31_A$ and $31_B$.

FIGURE 6 of the drawings illustrates a modification of the circuit arrangement of FIGURE 5 wherein a plurality of on-off take-over controls are used in conjunction with a main proportional control to control the operation of a time ratio control power circuit such as that shown in FIGURE 1. FIGURE 6 of the drawings employs different forms of control circuit means, the use of any one of which is determined primarily by the nature of the alarm signal that is used to initiate take-over action. For example, the output from a current limit, from a second harmonic detecting circuit, from an overvoltage limit, or from an overtemperature limit, or from any other type of sensor for the phenomenon which the power circuit is to be protected against, may be applied to any one of the additional inhibit winding means $24_B$ through $24_F$ to provide on-off take-over control of the power circuit. Further, as explained in connection with FIGURE 5 of the drawings, the ratios of the windings of the additional inhibit winding means may be so proportioned, and the values of the control signals applied thereto may be so proportioned to provide an "and" function in the operation of these circuits. For example, should it be desired for the circuit arrangement of FIGURE 6 to be turned off only if alarm signals are present on both windings $24_B$ and $24_E$, for example, then these windings, and the values of the control signals applied to them can be so proportioned that the total ampere-turns of both windings $24_B$ and $24_E$ when energized coact to prevent reset of the core of the saturable core transformer by reset winding 23. Similarly, it can be appreciated that other various relations can be worked out between the several inhibit windings to provide either "and" or "or" functions in their control over the operation of the power circuit being protected.

FIGURE 7 of the drawings is a schematic circuit diagram of a form of high frequency time ratio control chopper circuit having a constant frequency output wherein the time-on of a power transistor 41 connected in circuit relationship with a load and suitable high voltage power supply, is varied to thereby vary the load current supplied to the load through the power transistor 41. In the circuit arrangement of FIGURE 7, the power transistor 41 has its emitter-base coupled across a saturable reactor winding 42 of a saturable core transformer 43. The winding 42 is wound in common on a toroidal core member 44 with a set-reset winding 45, a first inhibit control winding 46 in a conventional fashion, and an additional take-over control inhibit winding 52. The set-reset winding 45 is connected to a source of square wave alternating current potential having the wave form illustrated at 47 connected thereto through a current limiting resistor 48. The control winding 46 is connected through a blocking diode 49 across the emitter-collector of an NPN junction transistor 51 whose base is connected to a source of continuous linearly variable control signals $E_{CON}$. The additional take-over inhibit winding 52 is connected in a passive closed series circuit loop with a blocking diode 53 and the emitter-collector of an NPN junction transistor 54 whose base-emitter circuit is connected to a source of on-off take-over control voltage $E_{TO}$.

For the purpose of illustrating the operation of the circuit of FIGURE 7, first consider the case where there is no control signal $E_{CON}$ applied to the transistor 51, nor any take-over control signal $E_{TO}$ supplied to the transistor 54, and hence the control windings 46 and 52 have no effect on the operation of the circuit. Consider also that the core of the saturable core transformer 43 has been driven into negative saturation by the previous negative half-cycle of the square wave alternating current potential 47 supplied to the reset winding 45. Under these conditions, the positive half-cycle of the square wave alternating current potential 47 will drive the core of the saturable core transformer 43 out of negative saturation and tend to reset it towards positive saturation. As a consequence, a potential will be developed in the saturable winding 42 which is negative at the dot end and causes power transistor 41 to be turned on. Power transistor 41 will then be maintained turned on for the period of time required for the core of saturable core transformer 43 to be driven into positive saturation by the positive half-cycle of square wave alternating current potential 47. By proper design of the core of the transformer 43, the windings 45, 46, 42 and 52, and adjustment of the potential 47, the core 44 is driven into positive saturation at the termination of the positive half-cycle of square wave alternating current potential 47 under the assumed condition of no control signals applied to the transistors 51 or 54. Upon reaching positive saturation, the potential across the winding 42 will drop to zero. As a consequence, the emitter-base current of the transistor 41 decreases to zero and the power transistor 41 will start to turn off. During the succeeding negative half-cycle of the square wave alternating current potential 47, the core of the saturable core transformer 43 will be driven out of positive saturation towards negative saturation and will develop a reverse polarity potential across the winding 42 which is now positive at the dot end. As a consequence, the power transistor 41 will be turned full off during the negative half-cycle of the square wave potential 47, and the core of the saturable core transformer 43 will be driven back into negative saturation during the negative half-cycle to thereby complete one cycle of operation.

Consider now the effect of the first inhibit control winding 46 and its associated passive closed series loop circuit including the control transistor 51. By reason of the polarity of the connection of the blocking diode 49, the diode blocks any current flow during the positive half-cycle of the square wave potential 47 so that no current can flow through the winding 46 during the positive half-cycle. Hence, the first inhibit winding 46 will have no effect during the positive half-cycle of the applied potential 47. However, during the negative half-cycles of the applied square wave potential 47, an enabling potential of the proper polarity will be developed across the control winding 46 which is applied across the collector-emitter of transistor 51. If under these conditions, the control signal $E_{CON}$ is applied to the base of the transistor 51 so that it is turned on, current flow will take place through the closed series loop circuit which will have a value determined by the value of the control signal $E_{CON}$. By proper design of windings 45 and 46, the ampere-turns caused by the inhibit control winding 46 can be made to oppose the ampere-turns of the reset winding 45 during the negative half-cycles of the square wave alternating current potential 47. Therefore, in effect the control winding 46 controls the degree of reset of the core of the saturable core transformer 43 during the negative half-cycles of potential 47. By thus controlling the degree of reset, or the extent to which the core of the saturable core transformer 43 is driven towards negative saturation during the negative half-cycles of potential 47, the first inhibit control winding 46 in effect sets the amount of time which will be required for the succeeding positive half-cycle of the square wave alternating current potential 47 to drive the core 44 into positive saturation. Hence, the control signal $E_{CON}$ thereby controls the on-time of the power transistor 41. Thus, it can be appreciated that the power transistor 41 will be turned on at a constant frequency rate, but that its on-time is varied by control signal $E_{CON}$ to thereby proportionally vary the value of the load voltage $E_L$ being supplied through the power transistor 41 to the load.

The additional on-off inhibit control winding 52 functions in precisely the same manner as the first control winding 46 to control reset of the core member 44 during the negative half-cycles of the applied square wave alternating current potential 47. Accordingly, if a control signal $E_{TO}$ is present on the base of the transistor 54, this control signal, which is an on-off type of control turns the transistor 54 fully on, and causes a current flow through the additional inhibit control winding 52 that opposes any reset of the core 44 during the negative half-cycles. As a consequence, load current through the power transistor 41 will be reduced substantially to zero in the same manner as was explained in connection with FIGURE 5c of the drawings.

FIGURE 8 of the drawings is a detailed circuit diagram of a time ratio control chopping circuit employing the new and improved inhibit control of the present invention. In the circuit of FIGURE 8, a PNP junction power transistor 61 has its emitter-base connected through the primary winding 62 of a saturable core transformer 63, and through a filter inductance 64 and load 65 across the terminals (+ and −) of a direct current power supply. The primary winding 62 of saturable core transformer 63 is wound on a common core member (not shown) with a secondary winding 66, a reset winding 67, a first inhibit control winding 68, and an additional take-over inhibit control winding 69. All of these windings are of course inductively intercoupled to the primary winding 62 through the medium of the common saturable core member (not shown). The reset winding 67 is connected in series circuit relationship with a pair of bias resistors 71 and 72 across the emitter-collector of power transistor 61, and hence, effectively are connected across the terminals (+ and −) of the direct current power supply through the primary winding 62, filter inductance 64, and load 65. The dot end of the secondary winding 66 is connected to the juncture of the bias resistors 71 and 72, and the no dot end of secondary winding 66 is connected to the base of the power transistor 61. The first inhibit control winding 68 is connected in a passive closed series circuit loop including a blocking diode 73 and control transistor 74 having its base connected to a source of continuous linearly variable control signals $E_{CON}$. The additional inhibit take-over winding 69 likewise is connected in an additional passive closed series circuit loop including a blocking diode 75, and an NPN junction transistor 76 having its base connected to a source of on-off take-over control signals $E_{TO}$.

For the purpose of illustrating the operation of the circuit of FIGURE 8, consider first that the two control signals $E_{CON}$ and $E_{TO}$ are each equal to zero, and hence, the take-over control windings 68 and 69 have no effect on the operation of the circuit. Consider also that the power transistor 61 is in its nonconducting condition and that the core of the saturable core transformer 63 has been driven into negative saturation by the reset current flowing in the reset winding 67 at the end of the previous cycle of operation. With the circuit in this condition, a small negative bias will be applied from the bias resistors 71 and 72 to the base of the PNP junction transistor 61. This causes the power transistor 61 to be turned on so that a small emitter-collector current flows through the primary winding 62. This small emitter-collector current causes the core of the saturable core transformer 63 to be unsaturated, and to induce a potential in the secondary winding 66 which is negative at the dot end. This induced potential in the secondary winding 66 causes the power transistor to be turned full on. The power transistor 61 will then conduct for the period of time required for the core of the saturable core transformer 63 to be driven into positive saturation. Upon the core of the saturable core transformer reaching positive saturation, the two windings 62 and 66 will be decoupled so that the transistor 61 starts to turn off. When the power transistor 61 starts to turn off, the decreasing current through primary winding 62 induces a reverse polarity potential in the secondary winding 66 which is positive at the dot end, and causes the transistor 61 to be turned full off. With the transistor 61 turned off, the reset winding 67 takes over and drives the core of the saturable core transformer 63 back into negative saturation thereby completing one cycle of operation.

Continuous control over the value of the load current supplied to load 65 by the circuit arrangement of FIGURE 8 is accomplished with the first inhibit control winding 68 and its associated passive closed series loop circuit comprised by blocking diode 73 and NPN junction transistor 74. The NPN junction transistor 74 has its base connected to a source of continuous linearly variable control signals which of course will vary the conductance of the NPN junction transistor 74. It can be appreciated that by varying the conductance of the transistor 74, the ampere-turns of the inhibit control winding 68 acting on the core of the saturable core transformer 63 can be varied in a manner similar to that obtained with the variable resistor 28 of the circuit arrangement of FIGURE 1. Similarly, by varying the conductance of the transistor 76 connected to the additional inhibit take-over control winding 69, the ampere-turns of the winding 69 acting on the core of saturable core transformer 63 can be varied. The turn-off control signal $E_{TO}$ applied to the transistor 76 differs from the continuous linearly variable control signal $E_{CON}$ applied to the transistor 74, however, in that the transistor 76 is either turned full on or full off. Accordingly, if the transistor 76 is turned full on by the turn-off control signal $E_{TO}$ applied to its base, the ampere-turns of winding 69 will exactly oppose the ampere-turns of the reset winding 67 so that the core of the saturable core transformer 63 cannot be reset, thereby cutting off the load current supplied to the load 65 entirely. With the transistor 76 turned full off, the additional inhibit winding 69 will have no effect on the core of saturable core transformer 63. Accordingly, it can be appreciated that by connecting the base of the transistor 76 to the output of an overcurrent sensor, an overvoltage sensor, an overtemperature sensor, or some other sensing control, operation of the time ratio control chopping circuit of FIGURE 8 can be interrupted immediately in response to a protective turn-off control signal applied to the transistor 76. Concurrently, a continuous linearly variable control signal $E_{CON}$ supplied to the base of the transistor 74 can be used to proportionally control the value of the load voltage $E_L$ being supplied to the load 17 in response to a desired control program.

FIGURE 9 of the drawings illustrates a saturable current transformer-transistor inverter power circuit employing the new and improved inhibit take-over control as a part thereof. The inverter circuit shown in FIGURE 9 is comprised by a saturable core current transformer having at least two primary winding portions 81 and 82 which are inductively coupled to associated secondary winding portions 83 and 84, respectively. The saturable core current transformer 81 through 84 is a conventional wire wound saturable core current transformer of the type described, for example, in Chapter 21 of the textbook entitled, "Magnetic Amplifiers," by H. F. Storm, published by John Wiley and Sons, Inc., New York, N.Y., copyrighted in 1955, and recorded on Library of Congress Catalog Card No. 55–6432. The primary windings 81 and 82 of the saturable core current transformer are connected through the respective emitter-collector circuits of a pair of conductivity controlled NPN junction silicon power transistors 85 and 86, respectively, to the terminals 87 and 88 of a direct current power supply (not shown).

The positive terminal 87 of the direct current power supply is connected to a center tap point 89 of an output transformer 90 having a center tapped primary winding comprised by two winding halves 91 and 92. The primary winding halves 91 and 92 are inductively coupled through a linear core to a secondary winding 93 having a load (not shown) connected across its output terminals. By reason of the above arrangement, the primary winding portion 81 of the saturable core current transformer, the collector-emitter of NPN junction transistor 85, and the direct current power supply are connected in series circuit relationship across the winding half 91 of the center tapped primary winding of output transformer 90. Similarly, the primary winding portion 82 of the saturable core current transformer, the collector-emitter of junction transistor 86, and the direct current power supply are connected in series circuit relationship across the primary winding half 92 of the center tapped primary winding of output transformer 90.

In addition to the above basic components, the power inverter includes a starting circuit means comprised by a current limiting resistor 94 connected between the positive terminal 87 of the direct current power supply, and the center tapped point 95 at the junction of the two secondary winding portions 83 and 84 of the saturable core current transformer. By reason of this connection, starting current is caused to flow through the limiting resistor 94, through the base to emitter circuits of either of the junction transistors 85 or 86, and through the direct current power supply connected across the terminals 87 and 88. In order to assure that the starting current does indeed flow through the base-emitter circuits of the respective ones of the junction transistor devices 85 and 86, a blocking diode 96, or a pair of such diodes are connected in common in the base-emitter circuits of each of the junction transistor devices 85 and 86. The polarities of the blocking diode 96 are arranged in a manner such that the diode or diodes 96 block current flow through the power supply connected across the terminals 87 and 88 through limiting resistor 94 directly, but it instead forces a starting current to flow through the base-emitters of respective ones of the junction transistor devices 85 and 86. The diode or diodes 96 also further serve an impedance matching function.

The power inverter of FIGURE 9 further includes a pair of bias windings 97 and 98 which are connected in series circuit relationship with a pair of limiting resistors 99 and 101 across the direct current power supply upon either of the transistors 85 or 86 being rendered conductive. Additionally, a first inhibit control winding 102 is wound in common on the core member of the saturable core transformer comprised by windings 81 through 84 together with a plurality of additional take-over inhibit control windings 103 and 104. The first inhibit control winding 102 is connected in a passive closed series circuit loop with a pair of coupling diodes 105 and 106 and an NPN junction transistor 107 whose base may be connected to a source of continuous linearly variable control signals. The additional take-over inhibit control winding 103 likewise is connected in a passive closed series circuit loop including a pair of blocking diodes 108 and 109 and an NPN junction transistor 111 whose base-emitter is connected across a second harmonic detecting circuit comprised by a pair of diodes 113, two saturable reactors 114 and 115, and a pair of limiting resistors 116 and 117, all connected across the primary winding of output transformer 90. The additional take-over inhibit control winding 104 similarly is connected in a passive closed series circuit loop further comprised by a pair of blocking diodes 118 and 119 and NPN junction transistor 120 whose emitter-base circuit is connected back across an overcurrent sensing resistor 121.

The power inverter circuit shown in FIGURE 9 of the drawings operates in the following manner. The starting current flowing through the resistor 94 through the winding portion 83 into the base of the NPN junction transistor 85 causes a base-emitter current to flow through the transistor 85. This results in turning on the transistor 85 so that an emitter-collector current flows in the emitter-collector circuit of the transistor. The emitter-collector current flowing in the transistor 85 flows through the primary winding 81 of the saturable core current transformer and causes a current to be induced in the secondary winding portion 83 which is positive at the dot end of the winding 83. This voltage results in driving the base of the transistor 85 even more positive (which remember is an NPN transistor) so that transistor 85 is turned full on due to the regenerative effect of the winding portion 81 almost instantaneously. The transistor 85 then is held full on by the positive voltage developed at the dot end of winding 83 for a fixed period of time until the saturable core transformer saturates. When the saturable core current transformer saturates, the primary and secondary winding portions 81 and 83 are decoupled so that the voltage at the dot end of 83 becomes less positive than it was previously. As a result, transistor 85 starts to turn off, and as it starts to turn off, the collector-emitter current starts to decrease. This decreasing collector-emitter current unsaturates the winding portions 81 and 83 and reverses the polarity of the potential at the dot end of the winding 83. This results in turning the transistor 85 fully off. As the transistor 85 turns off, the starting current flowing in the resistor 94 turns on the transistor 86. Transistor 86 will then operate through a half-cycle of operation in the same manner as described with relation to the transistor 85 until the saturable core transformer 81 through 84 again saturates resulting in turning off transistor 86, and again turning on transistor 85 to thereby initiate a new cycle of operation of the inverter. Successive operations of the transistors 85 and 86 in this manner will then develop an alternating current across the secondary winding 93 of the output transformer 90. The bias windings 97 and 98 function during no load operating conditions of the circuit to prevent the circuit from breaking into an undesired mode of operation.

In the power inverter circuit arrangement of FIGURE 9, the plurality of isolated inhibit control circuits 102, 103, and 104 are arranged around a common core to inhibit operation of the inverter circuit in accordance with various control phenomena to which they respond. To be particular, any overcurrent signal sensed by the overcurrent sensing resistor 121 is supplied to the base of transistor 120 to cause this transistor to be turned on, and to inhibit further operation of the inverter in the previously described manner. Similarly, the presence of second harmonics in the alternating current output voltage is detected by one of the second harmonic detecting saturable windings 114 or 115, and an alarm signal is supplied to the base of the control transistor 111. The control transistor 111 then turns on the additional take-over inhibit control winding 103 to inhibit further operation of the inverter circuit. During normal operating conditions, a continuous linearly variable control signal supplied to the base of the transistor 107 will operate to proportionally control the output of the inverter circuit by controlling the time required to drive the core of the saturable core transformer into positive saturation upon turn-on of either of the power transistors 85 or 86. It should be noted that the inhibit control winding means 102, 103, and 104 are all individually isolated, one from the other, and therefore cannot interact on each other to falsely inhibit operation of the power inverter. Further, it should be noted that all of these individual inhibit winding means are insulated from the power output circuits, and from the power supply connected to the terminals 87 and 88 so that the low voltage components used in the control circuit cannot be subjected to ruinous high voltage potentials.

In certain circuit applications, it may not be necessary to insulate each of the several control input circuits from each other. For this reason, and in order to conserve components, a circuit arrangement as that shown in FIGURE 10 may be practical. In the circuit arrangement of FIGURE 10, a second harmonic detecting circuit shown within the dotted outline box 128 has its output connected across the emitter-base of an NPN junction transistor 131. The emitter-base of junction transistor 131 is also connected across an overcurrent sensing resistor 121. The NPN junction transistor 131 is part of, and controls, a passive closed series circuit loop further comprised by a take-over inhibit control winding 129 and a pair of coupling diodes 132 and 133. The take-over inhibit control winding 129 is wound in common on the saturable core member of the saturable core current transformer further including the windings 81 through 84 in the manner of the circuit arrangement described in FIGURE 9. In operation, the circuit of FIGURE 10 will function in precisely the same manner as the FIGURE 9 circuit, however, the NPN junction transistor 131 operates to perform an "or" function in that it will turn on the take-over inhibit control winding 129 upon the application of an alarm signal to its base from either the second harmonic detecting circuit 128, or from the overcurrent sensing resistor 121 to thereby inhibit further operation of the power inverter circuit in the manner previously described.

FIGURE 11 of the drawings illustrates a transistor time ratio control circuit which employs a different form of inhibiting control for both main proportional control and current limiting purposes. This transistor time ratio control circuit operates with a silicon control switch current limiting protective circuit to provide a proportionally controlled output voltage that is current limited. This control is achieved as a function of a control signal used to vary the charging time of a resistor-capacitor type of control circuit. The transistor time ratio control circuit includes a power transistor 141 which is connected in series circuit relationship with a load 142, a filter inductance 143, and the primary winding 144 of a saturable core transformer 145 across a pair of power supply terminals 146 and 147. The saturable core transformer 145 has a secondary winding 148 which is inductively coupled to the primary winding 144. The primary winding 144 is effectively connected in the emitter-collector circuit of the power transistor 141, and the secondary winding 148 is connected in the emitter-base circuit of power transistor 141. If desired, a battery or other source of starting current may be connected across the terminals 149, 151 to initiate operation of the saturable core transformer-transistor circuit.

In addition to the above arrangement, the power transistor 141 is connected in series circuit relationship with a single-turn conductor 152 that is inductively coupled to a saturable core transformer 153 connected in a current limit circuit 154. The current limit circuit 154 is comprised by the saturable core transformer 153 and a silicon control switch (SCS) 155 having its emitter terminal connected to the power supply terminal 147, its hold-on gate connected to a secondary winding 156 of saturable core transformer 153, its collector load terminal connected through a primary winding 157 of saturable core transformer 153 to a source of positive direct current potential, and its turn-on gate connected to a resistor-capacitor control circuit 161.

The control circuit 161 is comprised by a PNP junction transistor 162 connected in series circuit relationship with a resistor 163 and capacitor 164 across a direct current power supply. A continuous linearly variable control signal for controlling the operation of the time ratio control circuit is supplied to the base electrode of the PNP junction transistor 162. By this arrangement, conduction through the PNP junction transistor 162 controls the rate of charge of the capacitor 164. The potential across the capacitor 164 is coupled through a coupling diode 165 and resistor 166 to the turn-on gate of the SCS 155 of the current limit protective circuit 154 to control turn-on of the SCS 155.

The SCS 155 in the current limit protective circuit 154 is effectively coupled through a coupling capacitor 171 to the turn-on gate of a second silicon control switch device 172. The second SCS 172 has its load terminals connected through a limiting resistor 173 and feedback winding 174 wound on the core of the saturable core transformer 145 to the power supply terminal 146. The feedback winding 174 is inductively coupled to an inhibit control winding 175 which likewise is wound on the common core member of the saturable core transformer 145, and, hence, is inductively coupled not only to the feedback winding 174, but to the primary winding 144 and secondary winding 148 as well. The inhibit control winding 175 has an intermediate point grounded with one portion of the winding being coupled through a coupling diode 176 to the hold-on terminal of SCS 172, and the remaining portion of inhibit winding 175 being coupled through a second coupling diode 177 back to the hold-on terminal of SCS 172 in common with the first-mentioned winding portion connected through diode 176. In order to isolate operation of the current limit circuit and the inhibit circuit from the gating signal source, a blocking capacitor 178 and blocking diode 179 are provided along with an isolating resistor 181.

For a more detailed description of the manner of operation of the transistor-saturable core transformer time ratio control circuit comprised by power transistor 141, reference is made to U.S. Patent No. 3,102,206 cited above. It is believed sufficient for the present description, however, to point out that the transistor 141 is alternately turned on and off by the saturable core transformer 145 and the associated inhibit circuit comprised by SCS 172 and inhibit winding 175 together with current limit circuit 154 and control circuit 161. With such a circuit arrangement, the inhibit winding 175 performs a timing function to control turn-off of the power transistor 141 whether there is an overcurrent flowing in the single-turn conductor 152 or not. If there is no overcurrent flowing in the single-turn conductor 152, the control signal applied to the transistor 162 controls turn-on of the SCS 155 which is then turned off by saturation of the core of saturable core transformer 153. In the event of an overcurrent flowing through the power transistor 141, the SCS 155 in the overcurrent limit protective circuit 154 will be turned off by reason of the ampere-turns of the single-turn conductor 152 offsetting the ampere-turns of the primary winding 157 to thereby prevent feedback of a holding current to the hold-on terminal of SCS 155.

Upon the SCS 155 being turned off by either means mentioned above, a positive turn-on pulse is supplied through the coupling capacitor 171 to the turn-on gate of SCS 172. Upon SCS 172 being turned on, a collector current will flow through the feedback winding portion 174 which is inductively coupled to the inhibit winding 175. This induces a holding current in the inhibit winding 175 which then serves to hold the SCS 172 turned on. While the SCS 172 is maintained in a turn-on condition, a closed current path is provided through the inhibit winding 175 which supplies ampere-turns in opposition to the primary winding 144 of the saturable core transformer 145 to such a degree that adequate base current can no longer be supplied to the base of the power transistor 141 thereby causing the power transistor 141 to be turned off instantaneously. In this manner, turn-off control and current limiting protection is provided for the power transistor 141.

From the foregoing description it can be appreciated that the present invention provides a new and improved fast-responding reliable take-over inhibit control for semiconductor power circuits. This new and improved inhibit take-over control may have a single or multiple insulated inputs which can be effectively isolated from each other and from the power circuits being controlled. Further, by properly proportioning the amount of control provided by each individual control input, the various inhibit controls are capable of providing an "and" function or an "or" function in their take-over control action for the power circuits which they protect. Further, because of the passive nature of the inhibit take-over controls, they do not adversely affect the power circuits which they protect during normal conditions of operation.

Having described several embodiments of a new and improved inhibit control for semiconductor power circuits constructed in accordance with the invention, it is believed obvious that other modifications and variations of the invention are possible in the light of the above teachings. It is therefore to be understood that changes may be made in the particular embodiments of the invention described which are within the full intended scope of the invention as defined by the appended claims.

What I claim as new and desire to secure by Letters Patent of the United States is:

1. An inhibit control for a power circuit including a saturable reactor winding wound on a common saturable core member with a reset winding, a first inhibit winding wound in common on the saturable core member with the saturable reactor winding and the reset winding, first circuit means connected in series circuit relationship with the first inhibit winding to form a passive closed series circuit loop energized by the first inhibit winding, first control means included in the first circuit means for controlling current flow through the closed series circuit loop to thereby control the operation of the saturable reactor winding, at least one additional take-over inhibit winding wound in common on the saturable core member with the saturable reactor winding, the reset winding, and the first inhibit winding, additional circuit means connected in series circuit relationship with the additional inhibit winding to form a passive closed series circuit loop energized by the additional take-over inhibit winding, and additional control means included in the additional circuit means for controlling current flow through the additional closed series circuit loop to thereby control the operation of the saturable reactor winding.

2. The combination set forth in claim 1 wherein the first control means comprises a continuous linearly variable control and the additional control means comprises an on-off take-over control.

3. An inhibit control for a power circuit including a saturable reactor winding wound on a common saturable core member with a reset winding, a first inhibit winding wound in common on the saturable core member with the saturable reactor winding and the reset winding, first circuit means connected in series circuit relationship with the first inhibit winding to form a passive closed series circuit loop energized by the first inhibit winding, first control means included in the first circuit means for controlling current flow through the closed series circuit loop to thereby control operation of the saturable reactor winding, a multiplicity of additional take-over inhibit windings wound in common on the saturable core member with the saturable reactor winding, the reset winding, and the first inhibit winding, a multiplicity of additional circuit means each connected in series circuit relationship with a respectve additional inhibit winding to form a multiplicity of passive closed series circuit loops each energized by their respective associated additional take-over inhibit windings, and a multiplicity of additional control means each included in a respective one of the multiplicity of additional circuit means for controlling current flow through its respective additional closed series circuit loop to thereby control the operation of the saturable reactor winding.

4. The combination set forth in claim 3 wherein the first control means comprises a continuous linearly variable control and at least two of the plurality of additional control means perform an "and" function in their take-over control.

5. An inhibiting control for a saturable core transformer coupled conductivity controlled conducting device including in combination first inhibit winding means inductively coupled to the windings of the saturable core transformer coupled conductivity controlled conducting device, first control means operatively coupled in circuit relationship with said first inhibit winding means for controlling current flow therethrough to thereby inhibit operation of the transformer coupled conductivity controlled conducting device, a source of first control signals operatively coupled to said first control means for controlling operation of the first control means, at least one additional take-over inhibit winding means inductively coupled to the windings of the saturable core transformer coupled conductivity controlled conducting device, additional control means operatively coupled in circuit relationship with the additional inhibit winding means for controllng current flow through the additional inhibit winding means to thereby inhibit operation of the transformer coupled conductivity controlled conducting device, and a source of on-off takeover control signal operatively coupled to the additional control means for controlling operation of the additional control means in response to a phenomenon to be controlled.

6. An inhibit control for a saturable core transformer coupled junction transistor including in combination a saturable core transformer having inductively coupled primary and secondary winding means, a junction transistor having an input circuit and an output circuit, the primary winding means of the saturable core transformer being connected in the output circuit and the secondary winding means of the saturable core transformer being coupled in the input circuit to thereby control the conductivity of the transistor, first inhibit winding means inductively coupled to at least the secondary winding means of the saturable core transformer for controlling the degree of saturation thereof, a control device connected in series circuit relationship with a first inhibit winding means for circulating current through the first inhibit winding means, a source of continuous linear variable control signal operatively coupled to the first control device for controlling the control device in response to a desired control program, at least one additional take-over inhibit winding means inductively coupled to the secondary winding means of the saturable core transformer for further controlling the degree of saturation thereof, an additional control device connected in series circuit relationship with the additional take-over inhibit winding means for circulating current through the additional take-over inhibit winding means, and a source of on-off take-over control signals for controlling the operation of the additional control device in response to a phenomenon to be controlled.

7. An inhibit control for a saturable core transformer coupled junction transistor including in combination a saturable core transformer having inductively coupled primary and secondary winding means, a junction transistor having an input circuit and an output circuit, the primary winding means of the saturable core transformer being connected in the output circuit and the secondary winding means of the saturable core transformer being coupled to the input circuit to thereby control the conductivity of the junction transistor, inhibit winding means inductively coupled to at least the secondary winding means of the saturable core transformer for controlling the degree of saturation thereof, a control device connected in series circuit relationship with the inhibit winding means for circulating current through the inhibit winding means, a first source of control signal operatively coupled to the control device for controlling the control device in response to a first phenomenon to be controlled, and at least one additional source of on-off take-over control signals operatively coupled to the said control device for controlling the control device in response to an additional phenomenon to be controlled.

8. An inhibit control circuit for a transistor-saturable transformer chopper including in combination a power transistor having a base-emitter circuit, a saturable core transformer having at least an inductively coupled saturable reactor winding, a reset winding, and first inhibit control winding all wound on a common saturable core member, the saturable reactor winding being connected across the emitter-base of the power transistor, a source of alternating current set and reset potential operatively coupled across the reset winding for setting and resetting the core of the saturable core transformer at predetermined intervals, control means operatively coupled in circuit relationship with the first inhibit winding for controlling current flow therethrough to thereby inhibit operation of the transistor-saturable transformer chopper circuit, a source of continuous linearly variable control signals operatively coupled to the first inhibit control winding for controlling the operation of the chopper circuit, and at least one additional take-over inhibit winding wound in common on the saturable core member with the saturable reactor winding, the reset winding, and the first inhibit control winding, additional circuit means connected in series circuit relationship with the additional take-over inhibit winding for controlling current therethrough to thereby inhibit operation of the chopper circuit, and a source of on-off take-over control signals operatively coupled to said additional control means to thereby control the operation of the saturable reactor-transistor chopper circuit in response to a phenomenon to be controlled.

9. An inhibit control for a power circuit including in combination a conductivity controlled conducting device connected in circuit relationship with a saturable reactor winding wound on a common saturable core member with a reset winding, a first inhibit winding wound in common on the saturable core member with the saturable reactor winding and the reset winding, first circuit means connected in series circuit relationship with the first inhibit winding to form a passive closed series circuit loop energized by the first inhibit winding, first control means included in the first circuit means for controlling current flow through the closed series circuit loop including the first inhibit winding to thereby control turn-on and turn-off of the conductivity controlled conducting device, a control signal source operatively coupled to the first control means for controlling operation of the power circuit, and at least one additional takeover inhibit winding wound in common on the saturable core member with the saturable reactor winding, the reset winding, and the first inhibit winding, additional circuit means connected in series circuit relationship with the additional inhibit winding to form a passive closed series circuit loop energized by the additional take-over inhibit winding, additional control means included in the additional circuit means for controlling current flow through the additional closed series circuit loop to thereby control turn-on and turn-off of the conductivity controlled conducting device, and a source of on-off take-over control signals operatively coupled to the additional means for controlling operation of the power circuit in response to a phenomenon to be controlled.

10. A new and improved power circuit having an inhibit control including in combination a conductivity controlled conducting device having an input circuit and controlling load current flow through the power circuit, a saturable reactor winding wound on a common saturable core member with a reset winding, and connected across the input circuit of the conductivity controlled conducting device, a first inhibit winding wound in common on the saturable core member with the saturable reactor winding and the reset winding, first circuit means connected in series circuit relationship with the first inhibit winding to form a passive closed series circuit loop energized by the first inhibit winding, first control means included in the first circuit means for controlling current flow through the closed series loop to thereby control operation of the conductivity controlled conducting device, at least one additional take-over inhibit winding wound in common on the saturable core member with the saturable reactor winding, the reset winding, and the first inhibit winding, additional circuit means connected in series circuit relationship with the additional inhibit winding to form a passive closed series circuit loop energized by the additional take-over inhibit winding, additional control means included in the additional circuit means for controlling current flow through the additional closed series circuit loop to thereby control the operation of the conductivity controlled conducting device, a source of continuous linearly variable control signals operatively coupled to the first control means, and a source of on-off take-over control signals operatively coupled to the additional control means.

11. A new and improved power circuit including an inhibit control comprised by a conductivity controlled conducting device having an input circuit and controlling load current flow through the power circuit, a saturable reactor winding wound on a common saturable core member with a reset winding and connected across the input of the conductivity controlled conducting device, a first inhibit winding wound in common on the saturable core member with the saturable reactor winding and the reset winding, first circuit means connected in series circuit relationship with the first inhibit winding to form a passive closed series circuit loop energized by the first inhibit winding, first control means included in the first circuit means for controlling current flow through the first closed series circuit loop to thereby control the operation of the conductivity controlled conducting device, a plurality of additional take-over inhibit windings wound in common on the saturable core member with the saturable reactor winding, the reset winding and the first inhibit winding, a plurality of additional circuit means each connected in series circuit relationship with a respective one of the plurality of additional inhibit take-over windings to form a plurality of passive closed series circuit loops energized by respective ones of the additional take-over inhibit windings, and a plurality of additional control means included in respective ones of the plurality of additional circuit means for controlling current flow through the respective additional closed series circuit loops to thereby further control the operation of the conductivity controlled conducting device.

12. The combination set forth in claim 11 wherein the first control means is connected to a source of continuous linearly variable control signals, and the plurality of additional control means are individually connected to the respective ones of a plurality of sources of on-off take-over control signals.

References Cited

UNITED STATES PATENTS

| | | | |
|---|---|---|---|
| 2,925,546 | 2/1960 | Berman | 321—25 |
| 3,168,648 | 2/1965 | Clausen et al. | 307—88.5 |
| 3,182,249 | 5/1965 | Pahlavan | 323—87 |
| 3,219,844 | 11/1965 | Martin | 307—88.5 |
| 3,233,113 | 2/1966 | Apple et al. | 307—88 |

JOHN F. COUCH, *Primary Examiner.*

W. M. SHOOP, JR., *Assistant Examiner.*